Jan. 9, 1945.  T. R. GRIFFITH  2,366,896

METHOD OF MAKING COMPOSITE ARTICLES

Filed Dec. 7, 1939

INVENTOR
Thomas R. Griffith
BY
Evans & McCoy
ATTORNEYS

Patented Jan. 9, 1945

2,366,896

UNITED STATES PATENT OFFICE 2,366,896

METHOD OF MAKING COMPOSITE ARTICLES

Thomas Raymond Griffith, Ottawa, Ontario, Canada, assignor to The Honorary Advisory Council for Scientific and Industrial Research, Ottawa, Ontario, Canada, a corporation of the Dominion of Canada Application December 7, 1939, Serial No. 308,053

10 Claims. (Cl. 154—2)

This invention relates to composite articles having rubber as a component therein and which may be produced without the application of heat. It particularly relates to composite articles or rubber and metal and to a process for preparing the same.

In the preparation of composite articles of rubber and metal by methods heretofore proposed, rubber either vulcanized or unvulcanized has been applied with heat and pressure to metals coated with suitable adhesives. Although the application of heat and pressure may not be objectionable in the preparation of small composite articles which are easily inserted into molds, it is often impracticable and very expensive to apply heat and/or pressure in the preparation of larger articles, such as rubber lined tanks, etc., or in the preparation of articles having complicated structure.

It is, therefore, an object of this invention to provide a method for preparing composite articles of rubber and metal wherein the application of heat and pressure is not required.

Another object of this invention is to provide a method for uniting vulcanized rubber to metal without the necessity for using heat.

Another object of this invention is to provide a method for coating metal with so-called cold curing rubber wherein good adhesion between the rubber and metal is obtained without the application of heat and without the necessity for the application of pressure during the vulcanizing.

A further object of this invention is to provide composite articles having cold curing rubber firmly attached to metal.

A further object of this invention is to provide a method for preparing composite articles when a rubber mixing machine or calender is not readily available, wherein a cold curing rubber compound is formed, after the lapse of a considerable time from the final mastication of its constituent compounds, without the aid of rubber machinery.

Other objects will be apparent from the following description of the article and a method for producing the same as illustrated by the accompanying drawing, in which.

Figure 1:
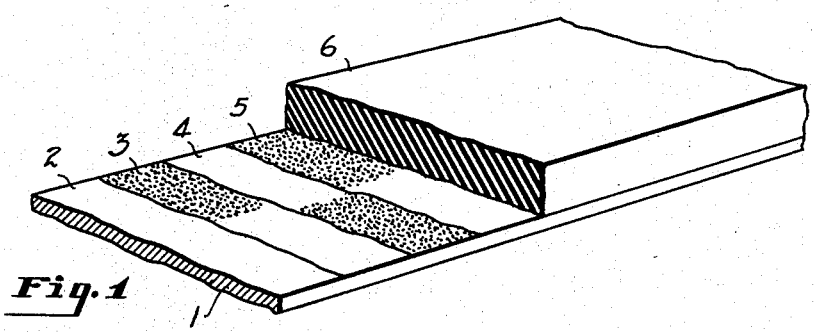
Figure 1 is a perspective view of a composite article having a homogeneous layer of a cold curing type of rubber compound attached to the metal.

In the preparation of composite articles of rubber and metal according to this invention, the metal which has been suitably cleaned, as by sandblasting, pickling, etc., is coated with a suitable rubber conversion product, and a suitable cold curing rubber compound is then brought firmly into contact with the coated surface. The cold curing rubber compound is then allowed to cure in contact with the coated metal, whereby adhesion between the compound and the metal takes place. If it is desired to firmly attach vulcanized rubber to metal or other material, the vulcanized rubber having a suitably prepared surface coated with suitable cement is brought in contact with the uncured cold curing compound on the metal or other surface and adhered thereto through the intermediary of such compound.

Rubber derivatives or rubber conversion products which are particularly effective in producing composite articles according to the methods of this invention may be prepared as set forth in my prior application Serial No. 277,086, filed June 2, 1939, and Serial No. 292,699, filed August 30, 1939, of which this application is a continuation in part. As set forth in application Serial No. 277,086, the improved rubber derivatives are prepared by milling sulphur or equivalent rubber vulcanizing agent, such as the vulcanizing type of accelerators, selenium, tellurium, and one or more suitable conversion reagents into rubber, such as smoked sheet or pale crepe, sheeting the mixture out to relatively thin sheets, heating the sheets under suitable conditions until the desired reaction takes place, and then masticating the product to render it soluble in rubber solvents.

As set forth in application No. 292,699, the conversion products are prepared by mixing a suitable conversion reagent into rubber, sheeting the mixture to relatively thin sheets, heating the sheets under suitable conditions until the desired isomerization reaction takes place, and then masticating the product to render it soluble in rubber solvents. As set forth in both the enumerated applications, conversion reagents which give products with good properties have been found to be in general mixtures of one or more salts of a strong acid and a weakly acidic substance. The character of the rubber derivative or conversion product produced seems to be improved when both of the ingredients are solid and may be further improved when one or more of the solid substances contains considerable water of crystallization.

The sulphates, and particularly the acid sulphates, are preferred as the salt of a strong acid, especially when they contain considerable water of hydration. For the best results, one constituent of these conversion reagents should be a weakly acidic substance. Aluminum acid sulphate, when used with a suitable co-operating weak acid material of the character of phosphoric acid or phosphoric anhydride, produces rubber derivatives having exceptionally desirable properties for use as the adhesive in the present invention.

Examples of salts of strong acids which may be used as an ingredient of a conversion agent are acid sulphates or double sulphates such as those of aluminum, iron (both ferric and ferrous), alkali metals, including ammonia, alkaline earth metal, and the closely related alums, such as potassium alum and other alums. In addition to the acid sulphates, certain sulphates may be used advantageously. Examples of these sulphates are iron (both ferric and ferrous), copper, aluminum, mercury, and cadmium. Examples of salts of strong acids other than sulphuric acid are bromides of mercury and zinc, chlorides of mercury, tin and aluminum, and alkali metal iodides. Phosphoric acid is a very good example of a weakly acid constituent of the conversion reagent suitable for forming a rubber conversion product preferred in this invention.

In some cases, however, where it is desirable to have the conversion product somewhat more soluble in rubber solvents, oxalic acid has been used advantageously. Other weak acids also desirable for use are benzoic, tartaric, phthalic, and salicylic. Particular acids may be selected depending upon the use of the conversion product, as various acids seem to impart slightly different properties. It is preferred, however, to use an acidic substance which can be obtained in solid form or in the form of a solid anhydride.

The conversion products thus prepared without sulphur are hydrocarbons, having carbon and hydrogen substantially in the proportions of carbon and hydrogen in rubber, and they chemically differ from rubber by having less chemical unsaturation. When a small amount of a vulcanizing agent, such as 3% or less of sulphur, is used in their preparation, the conversion products are not hydrocarbons and are, of course, less chemically unsaturated than rubber with or without an equivalent amount of added sulphur, etc. They give bonds having slightly higher strength at elevated temperatures. The masticated products are all soluble in comparatively inexpensive petroleum solvents, being thus distinguished from rubber chlorides, etc. in their solubility characteristics. They have less plasticity than rubber at elevated temperatures, such as for example 120° C., and are thus suitable for preparing assemblies for use at slightly elevated temperatures. It has been found that the conversion product adheres more thoroughly to cold vulcanized rubber when the preparation of the product is such as to produce comparatively large molecules, as is evidenced by comparatively high viscosities in solutions. The conversion products prepared as above set forth by heating the rubber admixed with solid conversion reagents in thin sheets having a thickness of less than 5 mm., and preferably a thickness of about 2 and 3 mm., give best adhesion to cold cured rubber, and it is therefore preferable to use them in the preparation of products of this invention.

Although the hardness of the rubber to metal adhesive, such as a rubber conversion product, may be adjusted so that a single layer or film of appropriate thickness may be successfully used, the adhesion of the rubber to the metal is improved when a suitable relatively hard adhesive which adheres to metal, such as a relatively hard rubber conversion product prepared as above, is applied to the metal and a relatively softer adhesive, such as a relatively soft rubber conversion product is superimposed on the relatively hard conversion product, and a suitable tie cement or a tie gum film is interposed between the softer adhesive and the curable rubber composition.

Referring particularly to Fig. 1 in the preferred method of making the composite article, a layer 3 of relatively hard rubber conversion product is applied to the surface 2 of the metal 1 which has been cleaned as by sandblasting. The layer 3 may be applied as one or more relatively thin coats if desired.

After the last coat of relatively hard rubber conversion product 3 has dried, a layer 4 of relatively softer rubber conversion product is superimposed on the dry hard conversion product. The relatively soft conversion product 4 is also preferably applied as a plurality of coats from a solution of suitable concentration. One or more coats of tie gum 5 is then applied over the dried surface of the soft conversion product or other suitable soft adhesive. A cold curing compound 6, formed in a suitable manner, is then pressed firmly on the tie gum 5, particular care being taken to avoid entrapping air which is likely to produce blisters, although entrapped air is not so detrimental as when hot vulcanization is used. It is allowed to cure in place at substantially normal temperatures, whereupon excellent adhesion is obtained between the rubber 6 and the metal.

When a single adhesive is used in place of layers 3 and 4 between the rubber and the metal, its hardness and plasticity should be adjusted intermediate to the hardness and plasticity of the soft and hard conversion products, so that it will have good adhesion to both rubber and metal.

The relatively harder rubber conversion products or rubber derivatives may be produced by heating a mix containing an increased quantity of conversion reagent, by heating a given thinly sheeted mixture for a longer period of time, or by heating a more thinly sheeted mixture.

The strength of the bond between rubber and metal obtainable when using rubber conversion products of this type may be further increased when suitable short fibres or powdered solids are incorporated in the adhesives. Examples of such materials are short fibre asbestos, carbon black, zinc oxide, magnesium oxide, or carbonate and the like.

The tie cement 5 may be superimposed on the layer of soft rubber derivative 4 and may, if desired, contain sulphur and an accelerator compatible with that used in the cold curing rubber. It is sometimes preferable to omit these ingredients from the tie cement composition. This omission is feasible since these ingredients will usually migrate into the tie cement from the superimposed cold curing rubber compound. The tie cement may contain a suitable amount of powdered solids, such for example as zinc oxide or fibrous materials, such as short fibre asbestos, etc. A suitable tie cement may, for example, be formed by mixing 100 parts of rubber with suitable compounding ingredients, such as about 40 parts of carbon black, 20 parts of short fibre asbestos, 1.25 parts of stearic acid, 5 parts of zinc oxide, with or without vulcanizing agents, antioxidants and accelerators, and dissolving the compounded rubber in suitable solvents.

The cold curing compound 6 is superimposed upon the layer 5 of tie cement. The cold curing compound used may be prepared by methods well known by those skilled in the art and contains as essential ingredients rubber, sulphur or an equivalent vulcanizing agent, and a highly active accelerator or combination of a plurality of accelerators or accelerators and activators which yield active acceleration of vulcanization capable of curing rubber at ordinary or slightly elevated temperatures. The more rapid cold curing compounds usually contain two accelerators, one of the accelerators acting as an activator for the other. To avoid the curing of the rubber during the mixing or storing thereof, the compound is preferably prepared in two component batches, one batch containing a rapidly acting accelerator and the other batch containing sulphur with or without activating accelerator. Both batches may contain other desirable rubber compounding ingredients such as stearic acid, antioxidants, pigments, etc. The cold curing compound is then prepared by mixing the two batches just prior to the preparation of the composite article.

Figure 2:
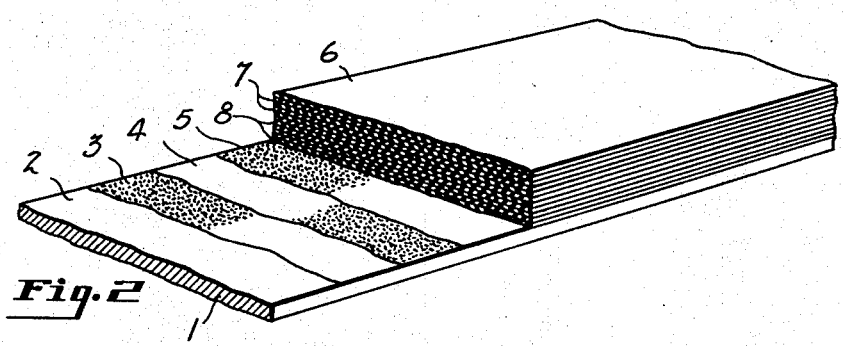
Fig. 2 is a perspective view of a composite article having a cold curing rubber compound which has been built up by superimposing thin layers of component compounds attached firmly to the metal.

The cold curing compound may be formed by plying up alternate relatively thin layers of the two component batches of the compounds. Thus, the separate batches, only one of which contains the vulcanizing ingredient, may be sheeted out to thicknesses of the order of 0.020 inch or so, and the cold curing compound formed by superimposing alternate layers 7 and 8 of these respective batches, as is illustrated in Fig. 2. When the laminations 7 and 8 of the cold curing compound are relatively thin, the sulphur or equivalent vulcanizing agent, accelerator, and activator will migrate from one lamination into another so as to vulcanize the entire cold curing compound as a mass.

The formation of the cold curing rubber compound by superimposing thin layers of component compounds has the advantage that the separate constituents may be stored for considerable periods of time without curing taking place. When the complete mixture has been formed, however, it must ordinarily be used without substantial delay.

When in accordance with this invention it is desirable to produce composite articles in which vulcanized rubber is firmly attached to metal, the cold curing compound, which may be a film deposited from a cement thereof and/or a thicker layer, is disposed between the vulcanized rubber and the metal.

The vulcanized rubber surface is roughened as by sandpaper buffing and coated with a tie cement, such for example, as is described above. The cold curing compound is then superimposed on the metal, the surface of which has previously received a coating of rubber to metal adhesive and a coating of tie cement thereon, and the roughened and coated surface of the vulcanized rubber is then pressed firmly against the exposed surface of the layer of cold curing rubber compound. The air should be squeezed out from between the surfaces last brought together by suitable means, such as by rolling, to secure good contact between the materials. The cold curing rubber can be made by mixing the components of two split batches and forming a layer of the thickness desired, or relatively thin layers of separate component batches may be alternately plied to the thickness desired and placed as indicated between the vulcanized rubber and metal. The cement coating on the vulcanized rubber may, if desired, be formed from one or both batches of the cold curing compound. In such a case, substantial adhesion between the vulcanized rubber and the metal may be obtained without the use of thicker layers of cold curing compound than the film deposited from the cement thereof.

Thus it has been found that substantial adhesion is obtained by coating the vulcanized rubber with a cement formed from one component batch of cold curing compound and coating the adhesive 4 in Fig. 7, or other suitable rubber to metal adhesive with an alternate component, allowing the films to dry, and bringing them into contact to produce a double film of cold curing compound. It is preferable, however, to use a thicker solid layer of cold curing compound. In such a case, the thicker layer compensates for unevenness in the surface of the vulcanized rubber or metal, and a stronger bond is usually produced. Good bonds may also be obtained by coating the vulcanized rubber and the film of rubber conversion product on the metal with layers of cement made by mixing two split batches of the cold curing compound, bringing the coated surfaces together and curing without the addition of substantial heat.

Figure 3:
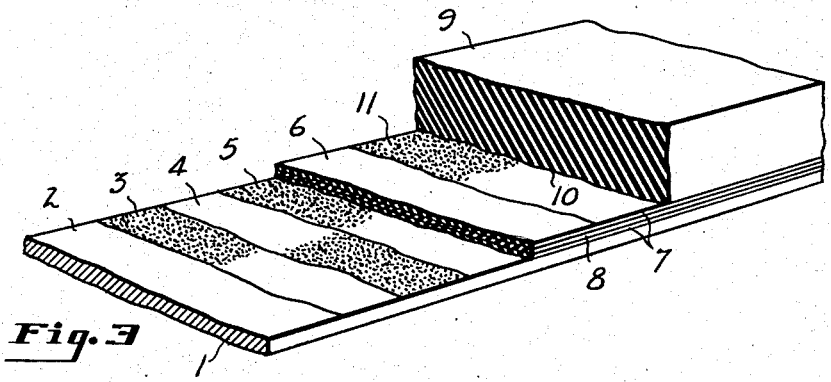
Fig. 3 is a perspective view of a composite article having vulcanized rubber attached to metal through a suitable intermediate cold curing compound.

In Fig. 3, which illustrates the composite article having previously vulcanized rubber firmly secured to metal, the surface 10 of the vulcanized rubber 9 which was suitably roughened by sandpaper or the like has been covered with a coating 11 of suitable tie cement, such as that above described. The tie cement 11 improves the bond between the vulcanized rubber 9 and the cold curing compound 6, which may be made up of laminated layers 7 and 8 containing respectively a very rapidly acting accelerator and sulphur with or without an activating accelerator. The cold curing compound 6 is bonded to the metal by means of a film 5 of tie cement, a film 4 of soft adhesive, and a film 3 of harder adhesive as heretofore described.

Figure 4:
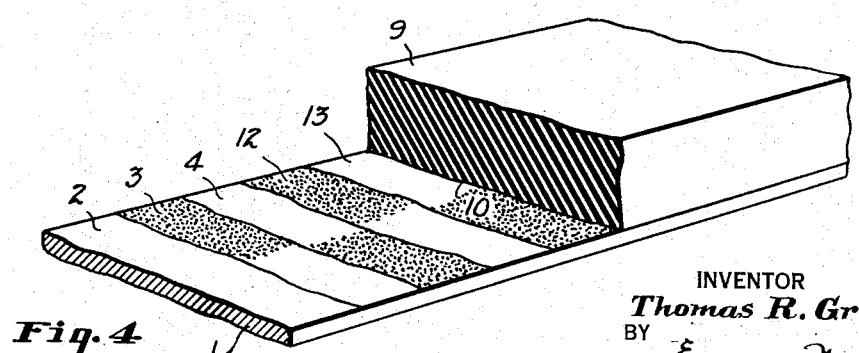
Fig. 4 is a perspective view of a modified form of a composite article having vulcanized rubber attached to metal.

Fig. 4 illustrates a modified form of a composite article having prevulcanized rubber 9 attached to metal. The surface 2 of the metal was successively coated with cements to form films 3 and 4 of a suitable adhesive, such as previously described, and film 12 of a cold curable rubber compound or a component of a cold curing compound, such for example as the compound hereinafter described as compound $a$ of Example 3. The film 13 was applied to the roughened surface 10 of the rubber 9 from a cement which also was made from a suitable compound, such as the hereinafter described compound $b$ of Example 3, which co-operates with the compound of film 12 to produce a compound readily curable without raising the temperature to a substantial degree. By bringing the dry films 12 and 13 into contact and allowing them to react, relatively strong adhesion is obtained and the rubber 9 is firmly attached to the metal 1.

If desired, films 3 and 4 may be substituted by a single film of a rubber to metal adhesive having a hardness intermediate to the hardness of films 3 and 4. Films 12 and 13 may be substituted by films of cold curable compound if desired, in which case a coat of cold curing compound should be applied to the roughened surface 10 of the rubber 9 and to the surface of adhesive film 4 on the metal, and the two prepared surfaces brought into contact after drying. If the surfaces of the vulcanized rubber and of the metal to be joined are coated with the layers or films as previously described and such surfaces are pressed together without drying of the last applied layers or films, a fairly good bond is obtained. If the so-coated surface of the vulcanized rubber or of the metal is wet with solvent, it is unnecessary to apply a tie cement over the film of rubber conversion product on the metal before placing the surfaces in contact. The tie cement applied may or may not be of the cold curing type.

The following examples illustrate the steps in the preparation of articles produced according to this invention.

Example 1

A relatively hard rubber conversion product was prepared by mixing 100 parts of pale crepe rubber with 18 parts of aluminum sulphate and 4.5 parts of phosphorus pentoxide. After the solid ingredients were incorporated in the rubber, 2 parts of water were added and the mix sheeted to a thickness of less than 5 mm. and preferably to about 2½ or 3 mm. thickness. These relatively thin sheets were heated on perforated trays in a vacuum oven for two hours at 150° C. They were then solubilized by milling for an appropriate period and dissolved in an appropriate solvent such as benzine or gasoline. Ten parts of zinc oxide, 2 parts of an antioxidant and 30 parts of carbon black were added to the hard mixture during the reworking or stabilizing period in this case. Zinc oxide was added preferably at the start of the milling so that any acid material that may have been present was neutralized promptly.

Example 2

A solution of relatively softer rubber conversion product was prepared by incorporating 7 parts of hydrated aluminum acid sulphate, 2 parts of phosphorus pentoxide and 1 part of water into rubber in the manner disclosed above in Example 1. The mixture was then sheeted into thin sheets of about 2 or 3 mm. thickness and the sheets heated at 150° C. for 90 minutes in an atmosphere having less oxygen pressure than the partial pressure of oxygen in atmospheric air. Upon removal from the oven the sheets were masticated on a rubber mill to render them soluble. During their mastication or solubilization 80 parts of zinc oxide and 2 parts of an antioxidant, such as phenylbetanaphthylamine, were added, the zinc oxide being added as soon as possible during the reworking period. The masticated product was dissolved in an appropriate rubber solvent to produce the adhesive solution or cement.

Sulphur may be added to the rubber conversion product or to the reaction mix as prepared in the above Examples 1 and 2, to produce adhesives. As set forth in my prior applications, sulphur should not be added substantially in excess of 3% if it be desired to produce a soluble product, and with the softer conversion product the preferred quantity is even less.

Example 3

The following rubber compounds were prepared in customary manner, compound $a$ containing the most active accelerator, and compound $b$ a more moderate accelerator and sulphur, one or both of the accelerators being an activator for the other.

| (a) | Parts by weight |
|---|---|
| Smoked sheet | 100 |
| Zinc butyl xanthate | 4 |
| Zinc oxide | 5 |
| Stearic acid | 3 |
| Antioxidant | 1 |
| Titanium dioxide | 5 |

| (b) | |
|---|---|
| Smoked sheet | 100 |
| Dibutyl amine | 4 |
| Zinc oxide | 5 |
| Sulphur | 4 |
| Stearic acid | 3 |
| Carbon black | 5 |

The compounds $a$ and $b$ may be sheeted to relatively thin sheets, such as .020 inch or .030 inch in thickness; they may be dissolved in solvents to form cements, or if they are to be used within a comparatively short time, they may be mixed together. In any case, the two compounds $a$ and $b$ should be kept separate until curing is desirable.

Example 4

A sheet of rigid material, such as aluminum or other metal having a clean surface, as is produced by sandblasting, was successively given two coats of the adhesive prepared in Example 1, two coats of the adhesive prepared in Example 2, and a coat of tie cement, each coat being allowed to dry before additional material was applied. After evaporation of the solvent from the tie cement, a rubber layer, prepared by plying up alternate thin sheets of the composition $a$ and $b$ in Example 3 to a sufficient thickness, was pressed firmly against the dry surface of the tie cement. The assembly thus prepared was allowed to remain for a period of about a day or so, whereupon the rubber was found to be completely cured and so firmly secured to the metal that the rubber tears in itself before separating from the metal.

The tie cement in the last example may or may not be of the cold curing type. If it is of the cold curing type, it may be prepared in various ways. Thus, solutions of either of the compounds designated as batch $a$ and $b$ of Example 3 may be used singly or in alternate layers, and the solid, laminated, cold curing compounds applied so that the lamination of an alternate batch is in contact with the outer layer of tie cement. The tie cement may also be prepared by mixing compounds $a$ and $b$ of Example 3 either before or after dissolving them, and the cement should be used before substantial vulcanization of the rubber has taken place. In this case either lamination of the cold curing compound may be in contact with the cement.

The composite article of Example 4 may also be prepared by substituting one or more layers of conversion product containing combined sulphur for one or more layers of the conversion products of Examples 1 or 2, to produce articles having substantially the same characteristics.

When convenient it is preferred that mixtures $a$ and $b$, Example 3, be combined on a rubber mill or suitable other rubber mixing apparatus to form a homogeneous cold curing compound. The homogeneous compound may then be applied to the surface of tie gum in the above example and an equally good bond will be produced.

It will be seen that while the above description has been limited substantially entirely to the production of rubber and metal assemblies, that the identical procedure is applicable for the production of composite articles wherein it is desirable to form bonds between rubber and another material.

The bonds produced according to the present invention have high strength, are resistant to chemicals, and are quite heat resistant. The process is especially desirable for applying rubber to larger articles, such as rubber lining to large tanks, pipes, etc. While the examples above have been limited to the bonding of natural rubber compounds to metal, the process of this invention is also applicable for the adhesion of various synthetic rubbers to metal and it is, therefore, intended that the rubber compounds attached to other solids be interpreted to include synthetic rubber compounds as well as natural rubber compounds.

While the rubber conversion products prepared as above are preferred, other materials having similar characteristics, such as relate to solubility or dispersability, and ability to bond to metal and rubber, may also be used. The compounds should preferably have a plasticity which is less than crude rubber at slightly elevated temperatures such as 120° C.

The process disclosed herein of uniting rubber to metal without the application of heat is suitable for uniting rubber to metals which are corrodible by sulfur during hot vulcanization, such as bronze, nickel, cobalt and the like, as well as uniting rubber to metals such as aluminum, steel, iron, brass, etc. In each case, a strong bond may be obtained.

The term "bonding of rubber to a rigid material, such as metal" has the meaning accepted by the rubber industry, that is, it is the formation of a union between the rubber and the rigid material of sufficient strength and permanence to permit the application of continued tension between the rubber and the rigid material without separation occurring, which tension is sufficient to cause elongation or deformation of the rubber.

It is obvious that various modifications may be made in the above described process without departing from the principles of the invention herein set forth, and it is my intention not to limit the appended claims except as may be necessitated by the prior art.

What I claim is:

1. A process for preparing composite articles wherein rubber is bonded to a metal with relatively great tenacity, which comprises superimposing, on the surface of the metal, films of rubber conversion products having different hardnesses and having less plasticity than has rubber at temperatures of 120° C., the film in contact with said metal being harder than the film nearest the rubber being joined thereto, applying a rubber compound curable at normal temperatures to the coated metal and curing the compound without the application of heat and pressure, said rubber conversion products being prepared by reacting a mixture containing rubber and a solid conversion agent for rubber in relatively thin section, being soluble in petroleum solvents for rubber and having the same carbon-to-hydrogen ratio as rubber and less unsaturation than rubber, said agent being of the class of reagents which are capable with the aid of heat of causing the isomerization of rubber as evidenced by a decrease in chemical unsaturation from that of rubber without change in the unit empirical formula and carbon-to-hydrogen ratio.

2. A process for producing composite articles wherein rubber is bonded to metal with relatively great tenacity, which comprises superimposing, on the surface of the metal, films of rubber conversion products having the same carbon-to-hydrogen ratio as rubber and having less chemical unsaturation than rubber, said films having different hardnesses, the film in contact with the metal being harder than the film nearest the rubber, applying a rubber compound curable at normal temperatures to the coated metal and curing the compound without the application of heat and pressure, said conversion products being soluble in petroleum solvents and being prepared by mixing a suitable rubber conversion reagent, comprising a water-soluble salt of a strong acid and a weakly acidic substance, with rubber, forming the mixture into relatively thin section of less than about 5 mm. thickness, heating the formed mixture to procure a reaction product and solubilizing, one characteristic being that said derivative has a lower plasticity at 120° C. than has crude rubber.

3. A process for producing composite articles wherein rubber is bonded to metal with relatively great tenacity, which comprises applying to the surface of the metal a solution of a hydrocarbon rubber conversion product having carbon and hydrogen in the same ratio as rubber, having less chemical unsaturation than rubber, and having a finely divided, substantially non-acidic, undissolved, inorganic solid mixed therewith, said solid being chemically inert to said conversion product, applying an unvulcanized cold curing rubber compound on the coated metal, and curing the rubber without the application of heat and pressure, said conversion product having a greater recovery-to-deformation ratio than has crude rubber at 120° C., and being a soluble reaction product of a solid mixture in thin section containing essentially solid rubber, a water-soluble salt of a strong acid, and water.

4. A process for producing composite articles wherein rubber is bonded to metal with relatively great tenacity, which comprises applying to the surface of the metal a solution of a rubber conversion product having less chemical unsaturation than rubber and the same carbon-to-hydrogen ratio as rubber, having less plasticity than rubber at slightly elevated temperatures of about 120° C., and having a finely divided, non-acidic, undissolved, inorganic solid mixed therewith, applying a suitable tie cement to the coated surface, applying a cold-curing type of rubber compound, and allowing the rubber compound to remain in contact with the coated metal until it cures at substantially normal temperatures, said conversion product being the reaction product of a rubber mix in thin section containing essentially a water-soluble salt of a strong acid, water, and a weakly acidic substance substantially as herein described.

5. A method for producing composite articles having cold vulcanized rubber firmly bonded to metal, which comprises superimposing, on the metal, films of a soluble rubber conversion product having different hardnesses, and being a rubber derivative prepared by reacting in a form having thin section a solid mixture consisting essentially of rubber, a reactive salt of a strong acid, a weak acid substance, and water, the film in contact with the metal being hardest, and having less plasticity than rubber at temperatures of the order of 120° C., applying a layer of cement containing rubber on the outermost film, forming a cold-curing rubber compound of suitable thickness by plying up alternate layers of relatively thin sheets of rubber compound containing, respectively, an accelerating ingredient and a vulcanizing constituent, applying the laminated compound thus formed to the coated surface of the metal, and allowing the said compound to cure without heat and pressure, said conversion product being soluble in petroleum solvents, having less chemical unsaturation than rubber, and having the same carbon-to-hydrogen ratio as rubber.

6. A process for preparing composite articles wherein rubber formed from a rubber compound readily curable at normal temperatures is firmly bonded to metal, which comprises coating the metal with at least one coat of a relatively hard hydrocarbon rubber derivative, successively superimposing at least one coat of a softer hydrocarbon rubber derivative having less chemical unsaturation and less plasticity at about 120° C. than crude rubber and a coat of a cement containing rubber on the coated surface, applying a vulcanizable rubber compound in contact with the layer of said cement, and curing the compound substantially without the application of heat, said rubber derivatives having the same carbon-to-hydrogen ratio as rubber and being prepared by reacting, in a form having thin section, a mixture containing essentially solid rubber, a water-soluble salt of a strong acid, and water.

7. A process for preparing composite articles wherein rubber formed from a rubber compound readily curable at normal temperatures is firmly bonded to metal, which comprises coating the metal with at least one coat of a rubber derivative which is soluble in petroleum solvents for rubber, and which is a rubber derivative prepared by incorporating an acid sulfate and a weak acid into solid rubber, heating the mix in a form having thin section to procure a reaction product, then masticating the product to render it soluble, applying a rubber compound vulcanizable at normal temperatures in contact with the coated metal, and allowing the compound to cure at substantially normal temperatures in contact with the coated metal, said rubber derivative being in the unsolubilized state characterized by having less plasticity and less unsaturation than has pale crepe rubber at 120° C. and by having the same carbon-to-hydrogen ratio as rubber and less chemical unsaturation than rubber.

8. A process for producing composite articles wherein rubber is firmly bonded to metal, which comprises successively superimposing, on a surface of the metal, films of a soluble rubber conversion product having the same carbon-to-hydrogen ratio as rubber and less chemical unsaturation than rubber, and having different hardnesses, the film next to the rubber being softer than that next to the metal, at least one of the films containing combined sulphur, and applying a rubber composition curable at normal temperatures to the outermost coating and curing the rubber without applying substantial heat, said rubber derivative being less plastic than rubber at temperatures of around 120° C. and being a reaction product of a mix formed in thin section and containing essentially rubber, a water-soluble salt of a strong acid, water, and sulphur, substantially as herein described.

9. A process for preparing composite articles wherein rubber formed from a rubber compound readily curable at normal temperatures is firmly bonded to metal, which comprises coating the metal with at least one coat of a rubber derivative which is soluble in petroleum solvents for rubber, which has the same carbon-to-hydrogen ratio as rubber and which is a rubber derivative prepared by incorporating a water-soluble salt of a strong acid, a weakly acidic substance, and water into solid rubber, heating the mix in a form having thin section to procure a reaction product, then masticating the product to render it soluble, applying a rubber compound vulcanizable at normal temperatures in contact with the coated metal, and allowing the compound to cure at substantially normal temperatures in contact with the coated metal, said rubber derivative in the unsolubilized state being characterized by having less plasticity and less chemical unsaturation than has pale crepe rubber at 120° C.

10. A process for preparing composite articles wherein rubber is bonded to a metal with relatively great tenacity, which comprises superimposing, on the surface of the metal, films of unmelted rubber derivatives having different hardnesses and having less plasticity than has rubber at temperatures of 120° C., the film in contact with said metal being harder than the film nearest the rubber being joined thereto, applying a rubber compound curable at normal temperatures to the coated metal and curing the compound without the application of heat and pressure; said rubber derivatives having the same carbon to hydrogen ratio as rubber, having less unsaturation than rubber, being soluble in petroleum solvents for rubber, and being masticated heat reaction products, prepared by heating, in a form having a section not substantially more than 5 mm. in thickness and in an atmosphere having less oxygen pressure than the partial pressure of oxygen in the atmosphere, a solid mixture of rubber and a solid rubber conversion reagent and masticating the product.

THOMAS RAYMOND GRIFFITH.